United States Patent [19]

Yamamura

[11] Patent Number: 5,013,135

[45] Date of Patent: May 7, 1991

[54] HEAD-UP DISPLAY WITH TWO FRESNEL LENSES

[75] Inventor: Souhei Yamamura, Takarazuka, Japan

[73] Assignee: Matsushita Electric Industrial Co., Ltd., Osaka, Japan

[21] Appl. No.: 496,297

[22] Filed: Mar. 20, 1990

[30] Foreign Application Priority Data

Jul. 10, 1989 [JP] Japan .................. 1-177508
Jul. 10, 1989 [JP] Japan .................. 1-177537
Dec. 28, 1989 [JP] Japan .................. 1-342648

[51] Int. Cl.$^5$ .................. G02B 27/10; G02B 3/08
[52] U.S. Cl. .................. 350/174; 350/276 R; 350/452; 340/705; 340/980
[58] Field of Search .................. 350/174, 276 R, 452; 340/705, 980

[56] References Cited

U.S. PATENT DOCUMENTS

| 3,737,212 | 6/1973 | Antonson et al. | |
|---|---|---|---|
| 4,218,111 | 8/1980 | Withrington et al. | |
| 4,261,647 | 4/1981 | Ellis | 350/174 |
| 4,652,870 | 3/1987 | Steward | 340/980 |
| 4,655,540 | 4/1987 | Wood et al. | 350/174 |
| 4,697,879 | 10/1987 | Gerbe | 340/705 |
| 4,787,711 | 11/1988 | Suzuki et al. | 350/174 |
| 4,840,465 | 6/1989 | Loy et al. | 350/174 |
| 4,886,328 | 12/1989 | Iino | 340/705 |

FOREIGN PATENT DOCUMENTS

| 88926 | 5/1985 | Japan | 340/705 |
|---|---|---|---|
| 2182456 | 5/1987 | United Kingdom | 340/705 |

OTHER PUBLICATIONS

M. Weiherauch et al., "Diffraction Optics Head-Up Display Technology", Sid International Symposium Digest of Technical Papers (Apr., 1980), pp. 36 & 37.
Nippon Sheet Glass Co., Ltd., Construction Catalog "Visual Field Selection Filter" (Dec. 20, 1988).
Nippon Sheet Glass co., Ltd., Automobile Windshield Glass Catalog "Intelligent Glass 21" (Oct. 27, 1989).
Panasonic Co., Ltd., National General Catalog "Twin Fluorescent Lamp Series" (Jul., 1988).

Primary Examiner—Jon W. Henry
Attorney, Agent, or Firm—Stevens, Davis, Miller & Mosher

[57] ABSTRACT

A head up display is provided for projecting as a virtual image the information from control meters in an airplane or an automobile in the front visual field. The display includes a light source disposed at the bottom of a casing, an LCD shutter disposed just above the light source, a first Fresnel lens disposed on the upper surface of the casing for the purpose of enlarging information on the LCD shutter, and a combiner disposed at an adjustable angle on the upper surface of the casing for the purpose of producing a virtual image of the information on the LCD shutter. The first Fresnel lens is disposed on the same face as that of the dashboard, and another Fresnel lens is provided on the front side of the casing so that the meter can be directly viewed through the casing.

14 Claims, 9 Drawing Sheets

HEAD-UP DISPLAY WITH TWO FRESNEL LENSES

FIELD OF THE INVENTION

The present invention relates to a head-up display which is provided on the dash board of a vehicle such as an airplane, a car or the like.

BACKGROUND OF THE INVENTION

Head-up displays (referred to as HUD hereinafter) enable the pilot in the cockpit of an airplane to confirm necessary information without turning their eyes to the dash board from the operation direction. Such head up displays are disclosed in U.S. Pat. Nos. 3,737,212 (1973) and 4,218,111 (1980).

Figure 9:
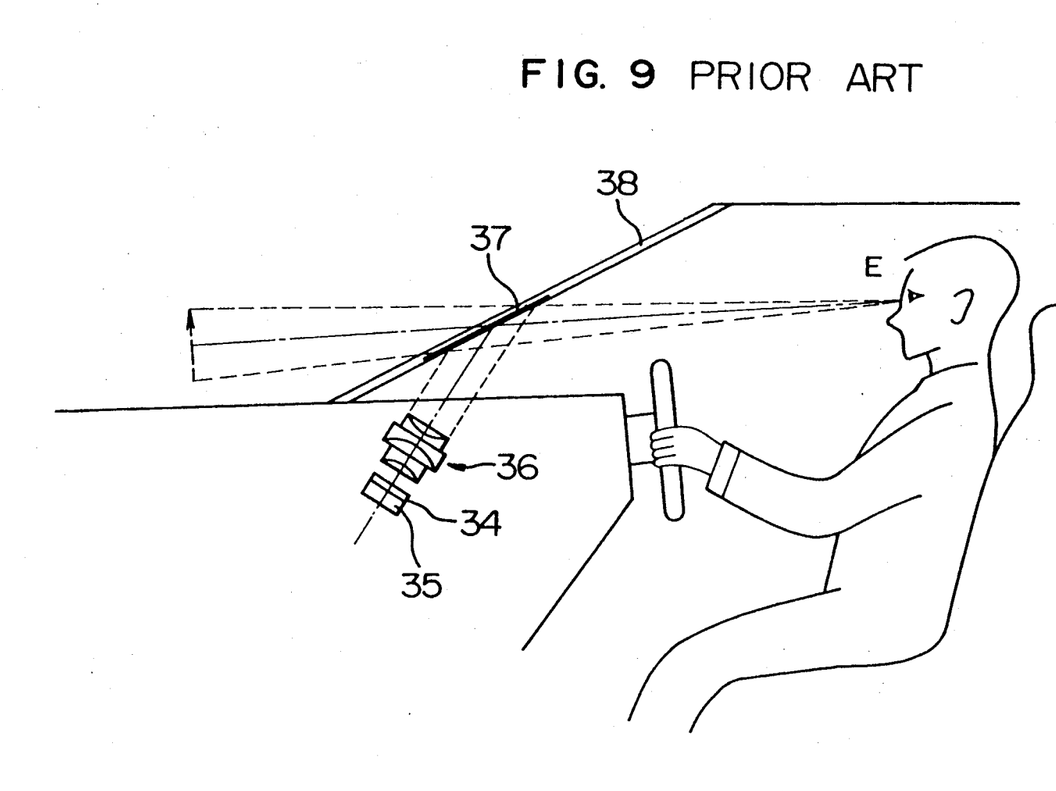
FIG. 9 is a drawing of a configuration of a conventional HUD.

Although expensive airplane HUD's are in practical use, they suffer from a problem in that they cannot be easily incorporated in a cockpit because of their large volume. FIG. 9 shows a conventional HUD developed for use for automobiles. This HUD comprises an electronic shutter LCD 34 for displaying information, a light source 35 for applying light to the rear side of the electronic shutter LCD 34 and an optical system 36 for enlarging the display screen of the electronic shutter LCD 34 to form a virtual image in a remote place. A combiner 37 is bonded to the inner side of a front glass 38.

However, in the aforementioned art, the HUD is merely installed on the existing dash board without a spatial commonality with the meters of the instrument cluster. Accordingly, an excess space is required for the HUD, and in general a space where the HUD is installed cannot be easily obtained in a car.

In consideration of the above-mentioned problem of the prior art, it is an object of the present invention to provide an HUD which can be installed in a space which is commonly used with instrument cluster meters three-dimensionally, thereby effectively using the existing space.

SUMMARY OF THE INVENTION

In order to achieve the object, the above present invention provides a HUD comprising a Fresnel lens which is disposed on the upper plate of the dash board of a vehicle and an electronic shutter LCD which is disposed in a lower portion of an HUD casing, with instrument cluster meters being arranged in the space between the Fresnel lens and the electronic shutter LCD so as to use a display space in common with the HUD. Further, a light source is provided below the electronic shutter LCD, and a combiner is provided on the upper plate.

In the above-described structure, a lamp unit having two parallel fluorescent lamps, such as a twin flourescent lamp unit having a bridge structure and manufactured by PANASONIC Co., Ltd., is used as the light source, and the tube heads of the lamps and the electronic shutter are cooled by a cooling fan for supplying air to the cockpit so that the performance is stabilized.

It is preferable that the combiner is rotatably supported by using pivots so as to be adjusted to the position of the eyes of the driver.

In order to effectively use the space for a HUD having the above-described structure in common with the instrument cluster meters, small meters made of a transparent material and a meter light source for applying light to the rear side of the meters are provided in the back plate of the HUD casing, and a Fresnel lens for magnifying the image of the meters is provided on the front side of the HUD casing so that the display panels of the small meters in the HUD casing can be enlarged through this Fresnel lens to form a virtual image in a remote location. This enables the HUD to be installed with advantageous space savings.

The above-described arrangement enables the common use of the space formed between the Fresnel lens and the electronic shutter LCD for the instrument cluster meters and the Fresnel lens and thus enables the HUD to be installed in a vehicle, with effective space utilization.

When a HUD configured as described above is installed in a car of a type having a front glass inclined at a large angle, in a certain situation, leakage light upwardly emanating from the instrument cluster meters is passed through the Fresnel lens disposed on the upper surface of the dash board and reflected from the upper portion of the front glass to enter the driver's eyes, resulting in a hindrance to the visual field. In order to resolve this problem, for example, it is possible to effectively use a means for cutting off the leakage light which comprises a filter which is made of visual field selection glass produced by Nippon Sheet Glass Co., Ltd. having a transparent central part (vertical direction $\pm 26.5°$) and opaque both sides (between angles 26.5° to 58.5° in both oblique directions) and which is provided on the upper surface of the Fresnel lens in contact therewith.

On the other hand, in order to increase the optical efficiency of the light source and the combiner in a HUD having the above-described structure, a light source which emits green light having a sharp spectral distribution is used, and the combiner is designed to effectively reflect the green light and reduce external green light so that the legibility of an HUD image can be improved (Refer to "Diffraction Optics Head-Up Display Technology" by Martin Weihrach and Rebert A. Lohmann, SID 80 DIGEST). In this type of structure, however, the combiner effectively reflects green light and does not reflect red and blue light. Accordingly, a red or blue warning lamp disposed in a lower portion on the rear side of the combiner attracts the attention of the driver through the combiner, thereby avoiding risks of the driver missing a warning.

In a case where a part of the inner surface of the front glass is employed as the combiner of the HUD, when the HUD is installed in a car of a type having a front glass inclined at a large angle, there are new problems concerning distortion of the HUD image caused by the curvature of the front glass pane and the alignment of the optical axis of the HUD with the reflective optical axis of the front glass combiner. An inexpensive technique for correcting the distortion of the HUD image is to change the lens effect by curving a part of the Fresnel lens. In this case, since the thickness of the Fresnel lens is so thin as to be about 2 mm, the periphery thereof must be held between the HUD casing and a pressure frame and fixed by screws so that it can be used at a high temperature in the interior of a vehicle. With respect to alignment of the optical axes, after the inclination of the glass combiner is determined, and after the directions of the optical axes of the meters in the HUD casing are determined, since the optical axis of the HUD itself does not always coincide with the reflective optical axis of the combiner, corrective alignment of the optical axes is required. Such alignment can be made simply by using a prism for correcting an optical axis corresponding to the inclination of the combiner, which is provided above the Fresnel lens, so as to turn the optical axis of the HUD to a given direction. In this case, the visual field selection filter made of the same materials as that described above is inserted as a means for cutting the leakage light from the meters into the space between the Fresnel lens and the prism so as to correct an optical axis corresponding to the inclination of the combiner.

DETAILED DESCRIPTION OF THE PREFERRED EMBODIMENTS

Figure 1:
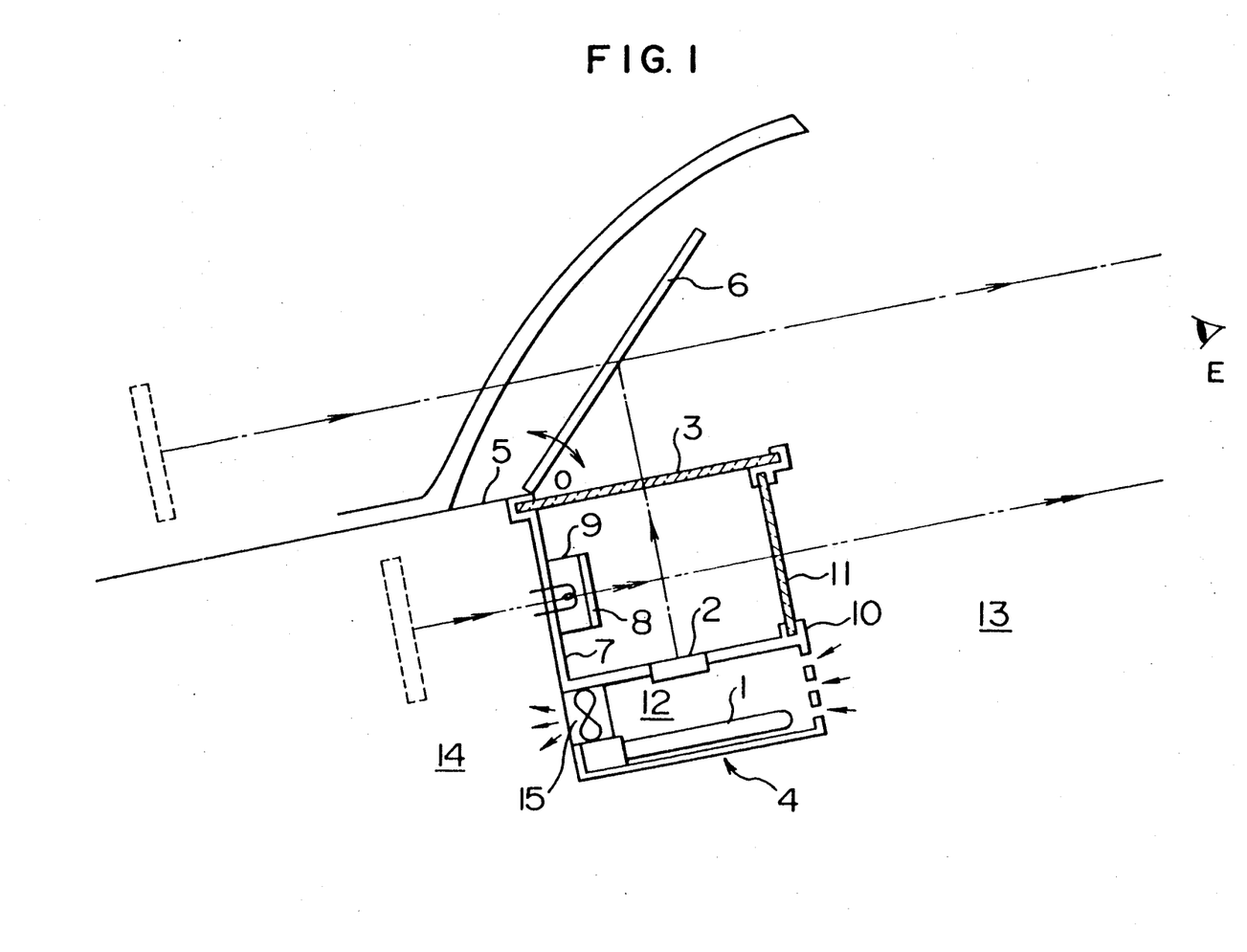
FIG. 1 is a view illustrating a configuration of an HUD as an embodiment of the present invention.

FIG. 1 is a drawing of the arrangement of an embodiment of a HUD in accordance with the present invention in which a light source 1, an electronic shutter LCD 2 and a Fresnel lens 3 are disposed in an HUD casing 4. The Fresnel lens 3 is in substantially the same plane as the upper plate 5 of a dash board. A combiner 6 is mounted to the upper plate 5 in a manner such that it can be vertically rotated while being fixed at any adjusted position.

Meters 8, which are made of a translucent material, an da meter light source 9 for applying light to the rear side of the meters 8 are provided on the back plate 7 of the HUD casing 4. In the front side of the HUD casing 4 is provided a meter Fresnel lens 11 for enlarging the display of the meters 8. The light source 1 and the electronic shutter LCD 2 are located in a light source chamber 12 which opens to the engine room 14 and the interior 13 of a car. In the light source chamber 12 is provided a cooling fan 15 for introducing air from the interior 13 and exhausting it into the engine room 14.

The above-described arrangement enables the driver to see through the combiner 6 the enlarged virtual image of the electronic shutter LCD 2, which is transmitted by the Fresnel lens 3 and which is superimposed on the external scene in a remote place, as shown by phantom lines in FIG. 1. The arrangement also enables the combiner 6 to be vertically rotated in accordance with a height of the driver's eyes. The enlarged virtual image of the display of the meters 8 produced by the meter Fresnel lens 11 can also be seen apparently in a remote place (for example, in the engine room), as shown by phantom lines in FIG. 1.

Figure 2:
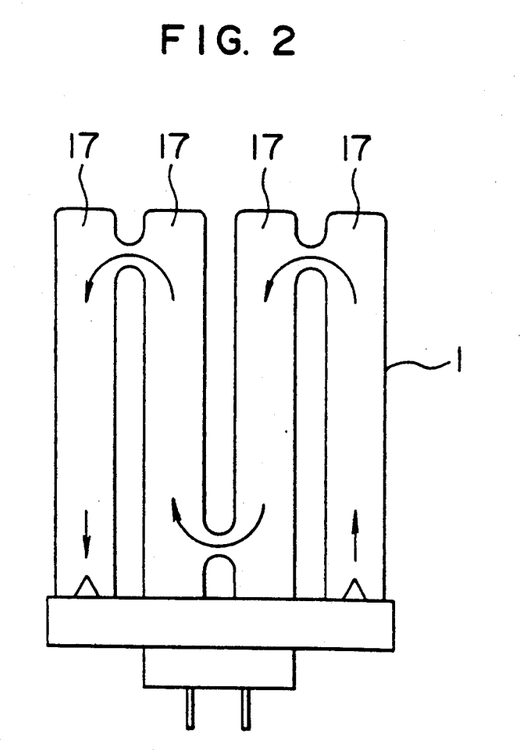
FIG. 2 is a view illustrating a lamp unit having two parallel fluorescent lamps, which is used as a light source in the HUD shown in FIG. 1.

FIG. 2 shows a lamp unit having parallel fluorescent lamps and used as the light source 1 of the HUD in the embodiment of the present invention. The fluorescent lamps have tube heads 17 which are kept at a constant temperature so that the internal mercury vapor pressure is stabilized, whereby an attempt can be made to effectively stabilize the quantity of light. In the present invention which makes use of this function, air in the interior 13 at a relatively stable temperature is fed into the light source chamber 12 by the cooling fan 15 so as to avoid increasing the temperatures of both tube heads 17 and electronic shutter LCD 2.

Figure 3:
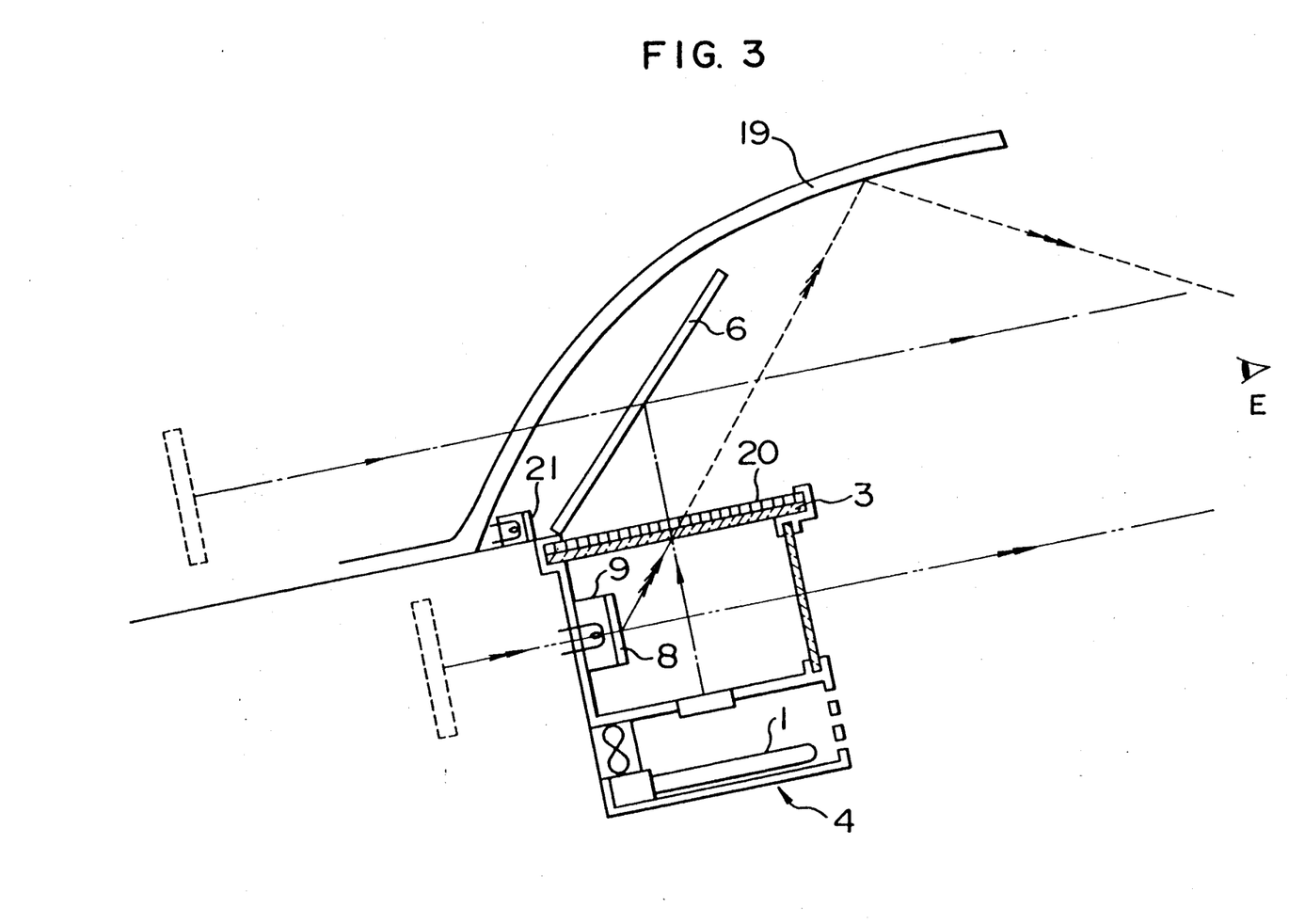
FIG. 3 is a view illustrating a configuration in which a visual field selection filter and a warning lamp are disposed in a car of a type having a front glass pane inclined at a large angle in which a HUD of the present invention is installed.
Figure 4:
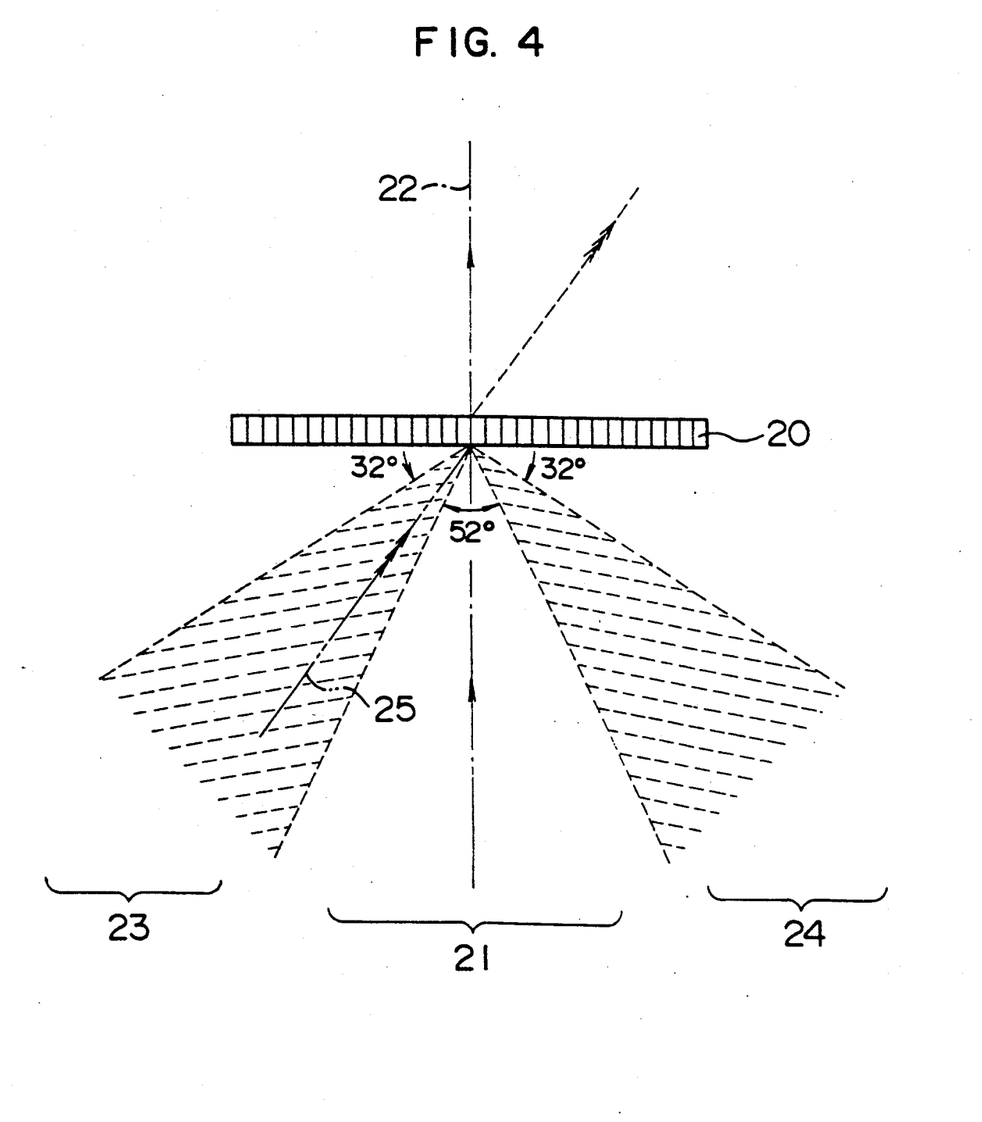
FIG. 4 is a view illustrating the characteristics of a visual field selection filter.

FIG. 3 is a view illustrating an arrangement in which a visual field selection filter 20 and a warning lamp 21 are disposed in a car of a style having a front glass 19 inclined at a great angle in which a HUD of the present invention is installed. In order to solve a problem wherein the light upwardly leaking from the meters 8 disposed on the back plate of the HUD casing 4 and the light source 9 passes through the Fresnel lens 3, reflects on the upper portion of the front glass pane 19 and then enters the eyes E of the driver, resulting in hindrance to the visual field, the leakage light is cut off by disposing the visual field selection filter 20 on the upper surface of the Fresnel lens 3 in contact therewith. The visual field selection filter 20 is, for example, manufactured by Nippon Sheet Glass Co., Ltd. and available on the market as building glass. FIG. 4 shows the characteristics of the visual field selection filter. The front region 21 (vertical direction ±26.5°) is transparent and allows light 22 to pass therethrough. Both side regions 23, 24 in both oblique directions (between 26.5° to 58.5°) are opaque and do not allow light 25 to pass therethrough.

Figure 5A:
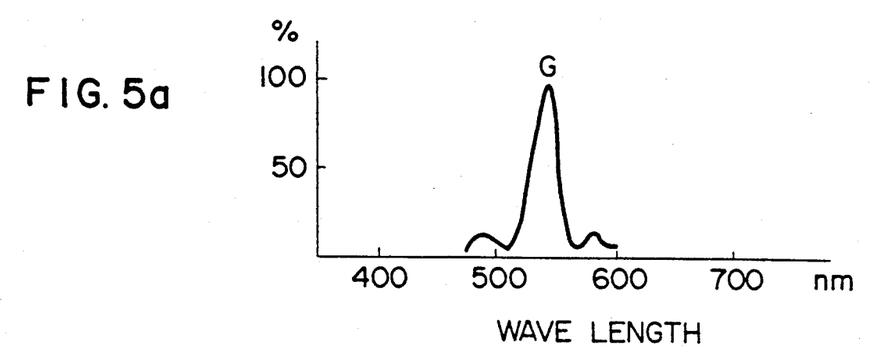
FIGS. 5a to 5c are views illustrating the spectral characteristics of a light source and a combiner.
Figure 5B:
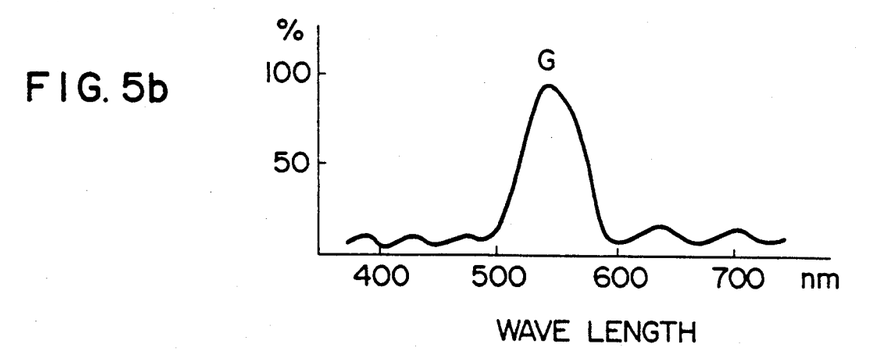
Figure 5C:
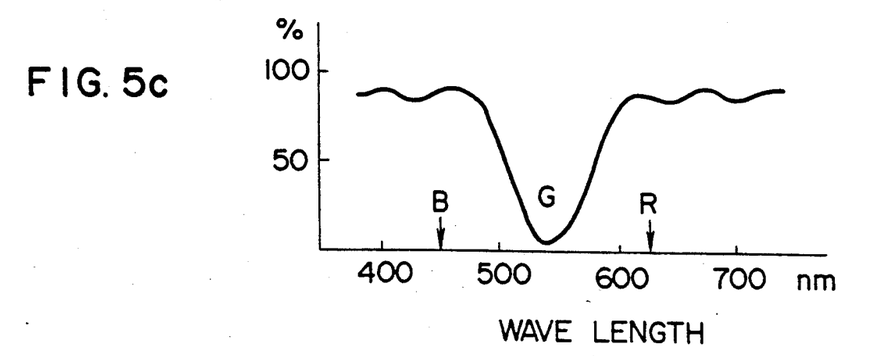

FIG. 5a shows the green light of the light source 1 having a sharp spectral distribution. FIG. 5b shows the spectral distribution of the light reflected from the combiner 6. As seen from this figures, the light of the light source 1 is well reflected. FIG. 5c shows the spectral distribution of the external light transmitted through the combiner 6 in which green light of the same type as that of the light source 1 is attenuated, while light of red R and blue B is not attenuated. It is therefore preferable to dispose a red or blue warning lamp in a lower portion behind the combiner 6 in the same way as the warning lamp 21 shown in FIG. 3.

Figure 6:
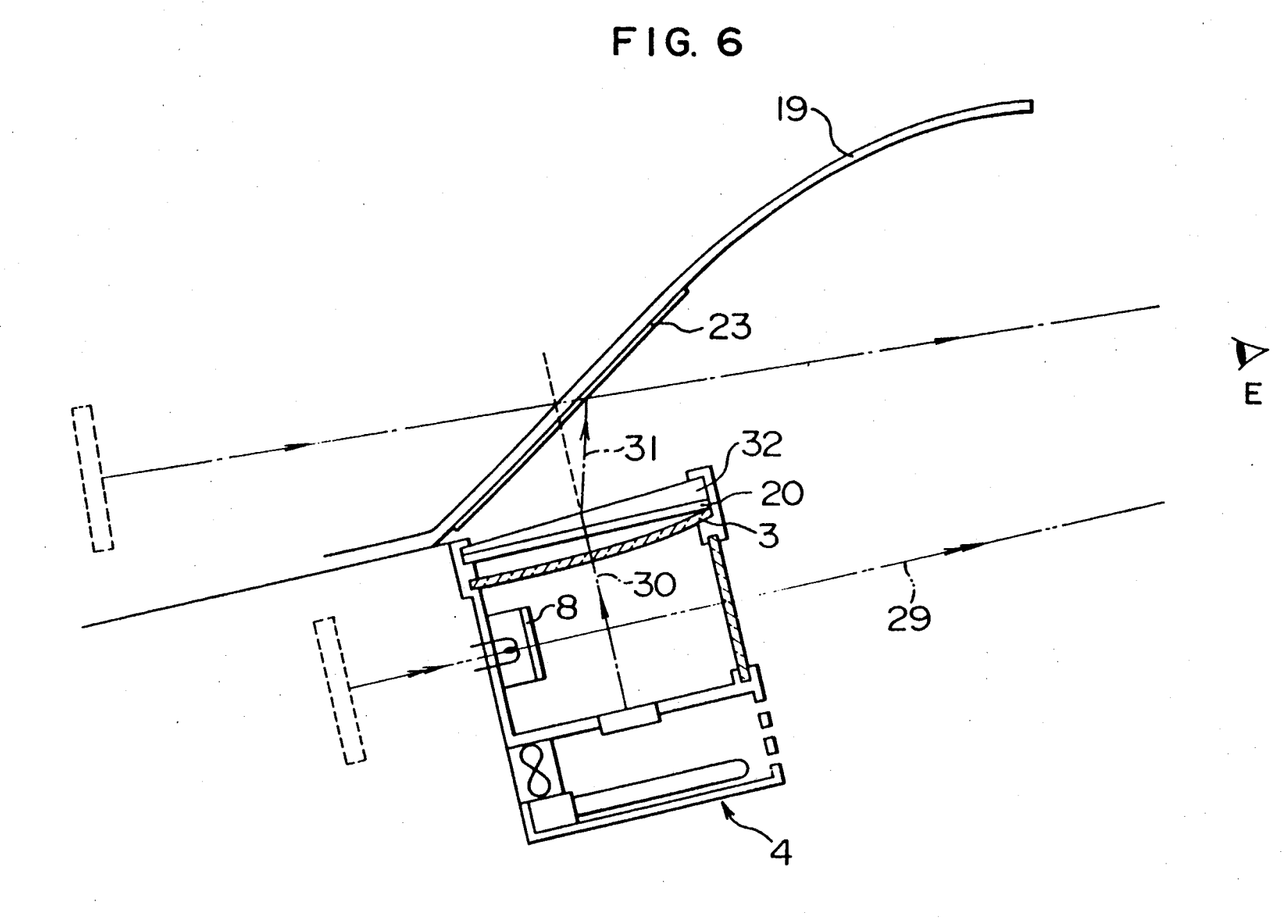
FIG. 6 is a view illustrating a configuration in which the distortion of an image is corrected, and an optical axis is corrected when a part of the inner surface of a front glass is employed as a combiner.
Figure 7A:
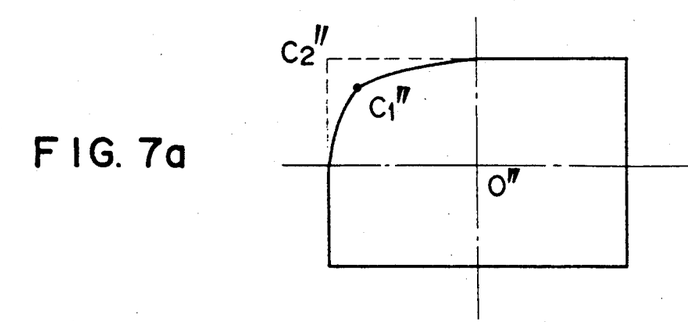
FIGS. 7a to 7c are views for explaining the correction of image distortion.
Figure 7B:
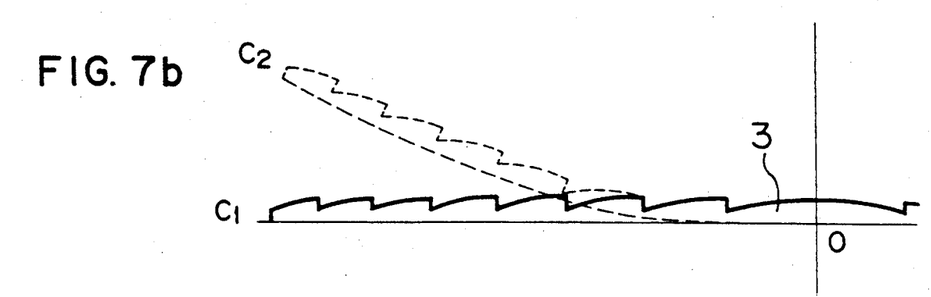
Figure 7C:
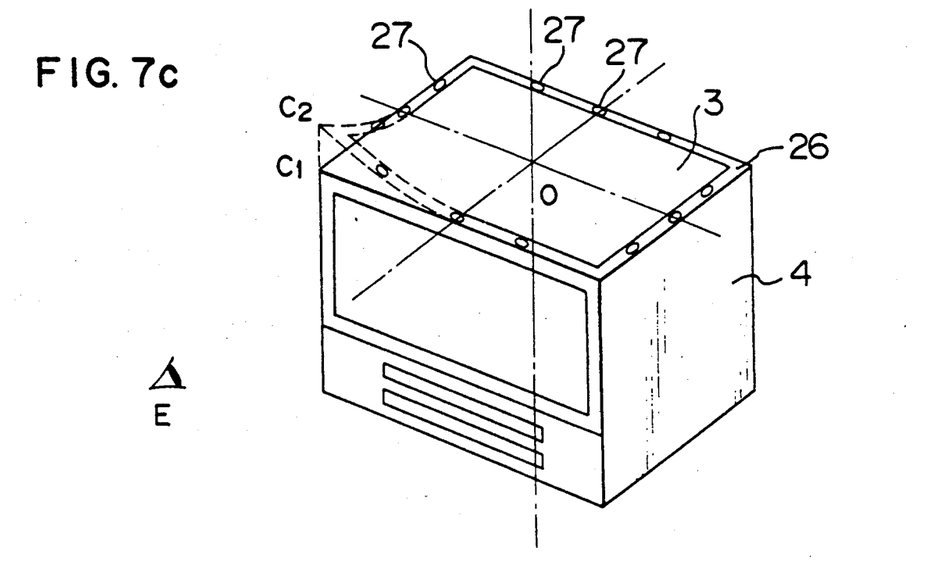
Figure 8:
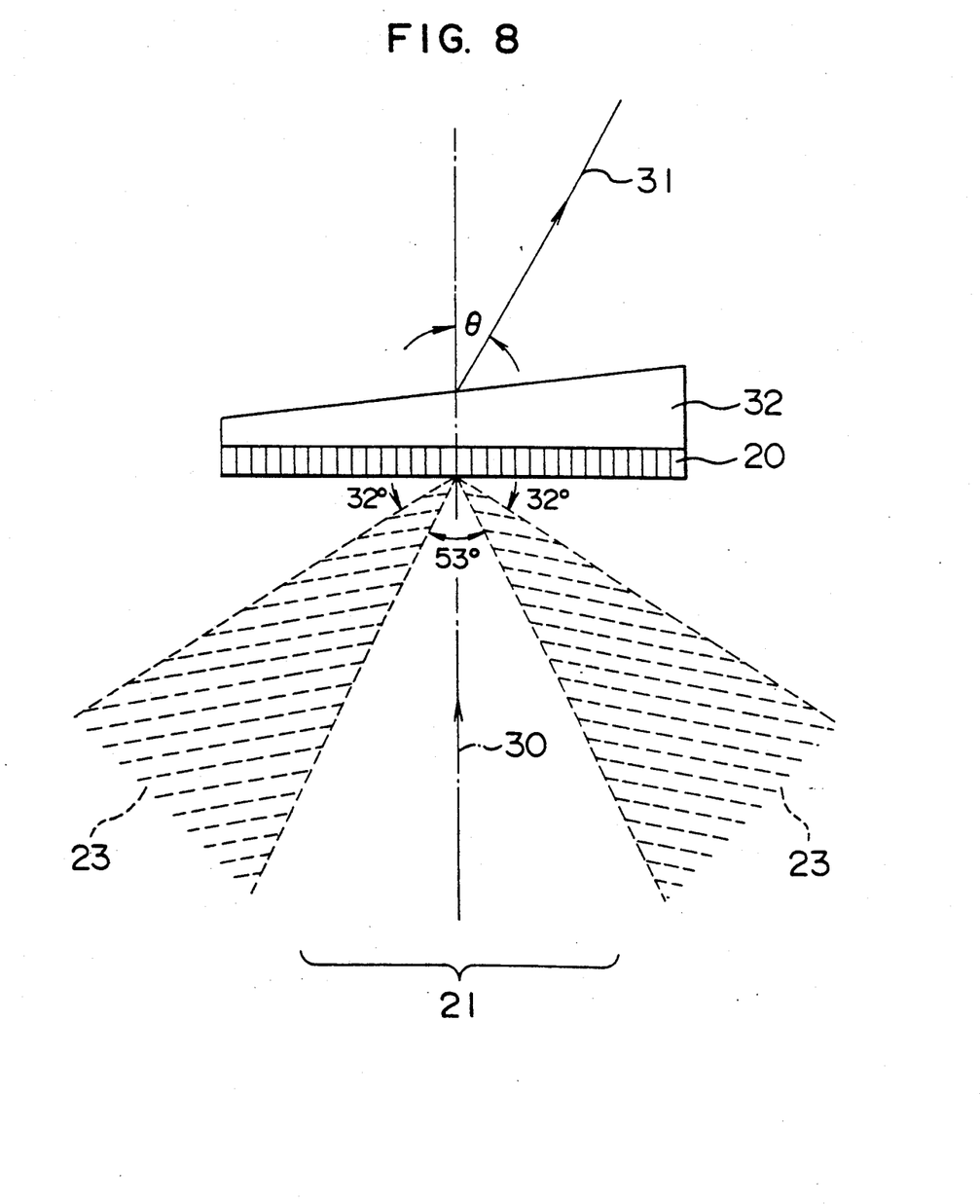
FIG. 8 is a view explaining correction of an optical axis.

In FIG. 6, when a part 23 of the inner surface of the front glass 19 is utilized as the combiner in the HUD according to the present invention, the distortion of an image caused by the curvature of the front glass 19 is corrected by curving a part of the Fresnel lens 3 so as to change the lens effect. FIGS. 7a to 7c are views for explaining the correction of distortion. For example, as shown in FIG. 7a, when the upper left corner $C_1''$ of the HUD screen is compressed due to a left side steering wheel type configuration, resulting in the occurrence of barrel distortion, the lens effect is changed by curving a part $OC_1$ of the Fresnel lens 3 to correct the distortion, as shown by $OC_2$ in FIGS. 7b and 7c. In this case, since the thickness of the Fresnel lens 3 is generally as thin as about 2 mm, the periphery of the lens 3 is held between the HUD casing 4 and a pressure frame 26 and fixed by means of screws 27. FIG. 6 also shows a view wherein, if the inclination of the combiner 23 in the front glass is determined by the style of car, and if the optical axial direction 29 of the meters 8 in the HUD casing 4 is determined beforehand, since the optical axis 30 of the HUD itself does not always coincide with the reflective optical axis 31 of the combiner 23, a prism 32 for correcting an optical axis corresponding to the inclination of the combiner 23 is disposed above the Fresnel lens 3 so as to deflect the HUD optical axis 30 toward the reflective optical axis 31 of the combiner 23 and bring it in alignment therewith. In this case, the visual field selection filter 20 is inserted between the Fresnel lens 3 and the prism 32 corresponding to the inclination of the combiner 23 or provided integrally with the lower surface of the prism 32 so as to cut off the light leaking from the meters 8 in the same way as that described above. FIG. 8 shows a view wherein the prism 32 corresponding to the inclination of the combiner 23 is provided integrally with the visual selection filter 20 so as to deflect, at an angle $\theta$, the optical axis 30 of HUD toward the reflective optical axis 31 of the combiner 23 and bring it in alignment therewith within the vertical front region 21, while the light rays within both oblique regions 23, 24, which are opaque, are cut off.

As described above, the present invention can provide an HUD which can be installed in a small space such as in the inside of the dash board of a car in common with the instrument cluster meters, thereby serving the space. In addition, the display panel of the meters can be seen as a virtual image in a remote location, and the distortion of the HUD image caused by the curvature of the front glass combiner can be corrected by curving the Fresnel lens. The HUD can be therefore used as a space-saving HUD having a simple structure for passenger cars, commercial cars such as trucks, wagons and the like, crane trucks, high speed trains and the like.

What is claimed is:

1. A head up display system having an HUD optical axis, said head up display for installation in or adjacent to a dashboard of a vehicle and comprising:
   a first Fresnel lens adapted to be provided on an upper plate of the dashboard;
   a liquid crystal display positioned below and spaced apart from said first Fresnel lens, said liquid crystal display and said first Fresnel lens defining a space therebetween;
   instrument meter clusters disposed in said space;
   a first light source provided below said liquid crystal display;
   a combiner adapted to be positioned above the upper plate of the dashboard and having a reflecting optical axis, for reflecting a virtual image of said liquid crystal display which is transmitted by said first Fresnel lens through said space so as to cause said virtual image of said liquid crystal display to be visible to a driver;
   a second light source provided behind said instrument meter clusters; and
   a second Fresnel lens disposed in said space in front of said instrument cluster meters so as to cause said virtual image of said instrument meter clusters to be visible to the driver.

2. A head up display system according to claim 1, wherein said first light source comprises a lamp unit having two fluorescent lamps and said head up display system further comprises a means for cooling said fluorescent lamps and said liquid crystal display.

3. A head up display system according to claim 1, wherein said combiner has a predetermined curvature adapted to conform to a curvature of a front glass of the vehicle and to be incorporated integrally with the front glass, and a visual field selection filter is disposed so as to be optically superimposed on said first Fresnel lens, such that light leaking from said instrument meter clusters which passes through said Fresnel lens to irradiate said front glass is prevented from entering an eye of the driver.

4. A head up display system according to claim 1, wherein said combiner is adapted to be disposed inside the front glass and said head up display system further comprises a warning lamp disposed at a position which is below the position of said combiner disposed inside the front glass and which can be recognized by said operator, whereby said warning lamp can be seen while being superimposed on said virtual image of said liquid crystal display.

5. A head up display system according to claim 3, wherein said first Fresnel lens is curved in order to correct distortion of said virtual image caused by said curvature of said combiner.

6. A head up display system according to claim 5, wherein said first Fresnel lens is held between rigid bodies for preventing deformation of said first Fresnel lens.

7. A head up display system according to claim 3, further comprising means for correcting said HUD optical axis, said correction means being disposed in optical combination with said first Fresnel lens.

8. A head up display system having an HUD optical axis, said head up display system for installation in or adjacent to a dashboard of a vehicle and comprising:
   a casing;
   a first Fresnel lens mounted on said casing such that when said casing is mounted on the vehicle, said first Fresnel lens is disposed substantially parallel to an upper plate of the dashboard;
   a liquid crystal display positioned below and spaced apart from said first Fresnel lens within said casing, said liquid crystal display and said first Fresnel lens defining a space therebetween;
   instrument meter clusters disposed in said space;
   a first light source provided below said liquid crystal display within said casing;
   a combiner positioned above said first Fresnel lens and having a reflecting optical axis, for reflecting a virtual image of said liquid crystal display which is transmitted by said first Fresnel lens through said space so as to cause said virtual image of said liquid crystal display to be visible to a driver;
   a second light source provided behind said instrument meter clusters within said casing; and
   a second Fresnel lens disposed within said casing in said space in front of said instrument meter clusters so as to cause a virtual image of said instrument meter clusters to be visible to the driver.

9. A head up display system according to claim 8, wherein said first light source comprises a lamp unit having two fluorescent lamps and said head up display system further comprises a means supported by said casing for cooling said fluorescent lamps and said liquid crystal display.

10. A head up display system according to claim 8, wherein said combiner has a predetermined curvature adapted to conform to a curvature of a front glass of the vehicle and to be incorporated integrally with the front glass, and a visual field selection filter is disposed so as to be optically superimposed on said first Fresnel lens, such that light leaking from said meters which passes through said Fresnel lens to irradiate said front glass is prevented from entering an eye of the driver.

11. A head up display system according to claim 8, wherein said combiner is adapted to be disposed inside the front glass and said head up display system further comprises a warning lamp disposed at a position which is below the position of said combiner disposed inside the front glass and which can be recognized by said operator, whereby said warning lamp can be seen while being superimposed on said virtual image of said liquid crystal display.

12. A head up display system according to claim 10, wherein said first Fresnel lens is curved in order to correct distortion of said virtual image caused by said curvature of said combiner.

13. A head up display system according to claim 12, wherein said first Fresnel lens is held between rigid bodies for preventing deformation of said first Fresnel lens.

14. A head up display system according to claim 10, further comprising means for correcting said HUD optical axis, said correction means being disposed in optical combination with said first Fresnel lens.

* * * * *